United States Patent [19]

Oda et al.

[11] Patent Number: 4,897,311

[45] Date of Patent: Jan. 30, 1990

[54] METAL-CERAMIC COMPOSITE BODIES

[75] Inventors: Isao Oda, Nagoya; Nobuo Tsuno, Kasugai, both of Japan

[73] Assignee: NGK Insulators, Ltd., Nagoya, Japan

[21] Appl. No.: 195,447

[22] Filed: May 12, 1988

Related U.S. Application Data

[63] Continuation of Ser. No. 867,441, May 28, 1986, abandoned.

[30] Foreign Application Priority Data

Jun. 28, 1985 [JP] Japan .................................. 60-126295

[51] Int. Cl.$^4$ ......................... C04B 35/48; B32B 15/04
[52] U.S. Cl. ..................................... 428/433; 428/472
[58] Field of Search ................. 428/472, 469, 468, 67, 428/433, 450, 139; 29/525

[56] References Cited

U.S. PATENT DOCUMENTS

| | | | |
|---|---|---|---|
| 4,544,607 | 10/1985 | Kaneno et al. | 428/472 |
| 4,590,901 | 5/1986 | Mizuhara | 92/212 X |

FOREIGN PATENT DOCUMENTS

| | | | |
|---|---|---|---|
| 98671 | 6/1982 | Japan | 428/472 |
| 592802 | 2/1978 | U.S.S.R. | 428/472 |
| 847533 | 8/1957 | United Kingdom | 428/472 |

*Primary Examiner*—Joseph M. Gorski
*Attorney, Agent, or Firm*—Arnold, White & Durkee

[57] ABSTRACT

A metal-ceramic composite body is disclosed, which comprises a metallic member having a depression or through-hole therein, and a ceramic member having a protrusion capable of inserting into the depression or through-hole. Both the members are joined to each other through interference fitting below such a temperature that the structure of the metallic material begins to change into austenite phase or a temperature between the above temperature and a service temperature.

5 Claims, 3 Drawing Sheets

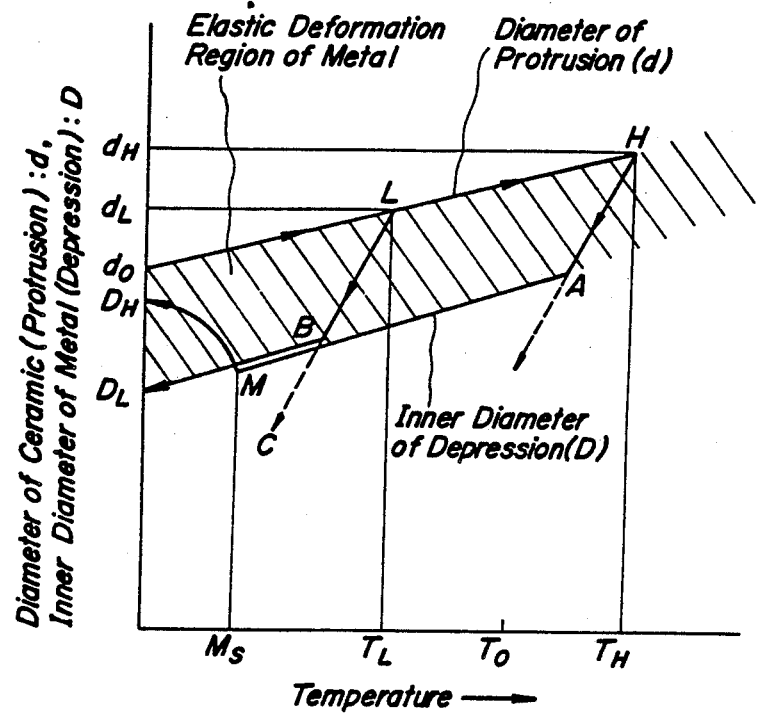
FIG_1
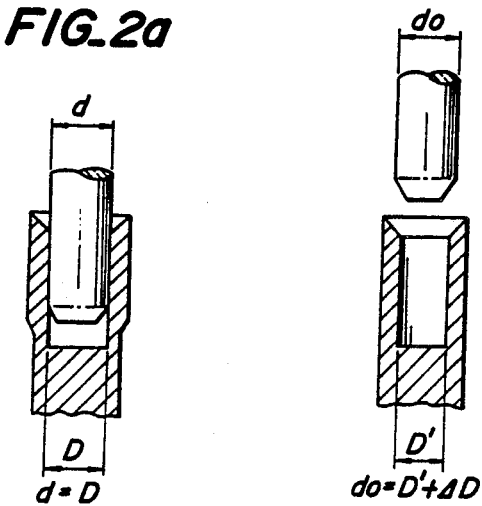
FIG_2a
FIG_2b

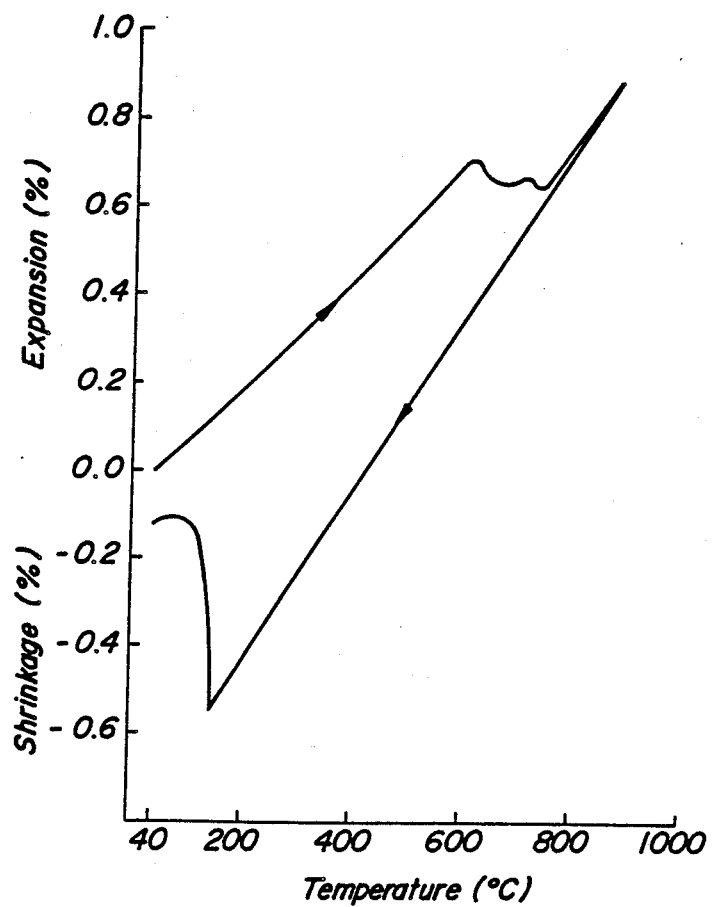
FIG_3

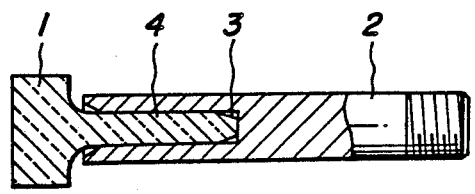
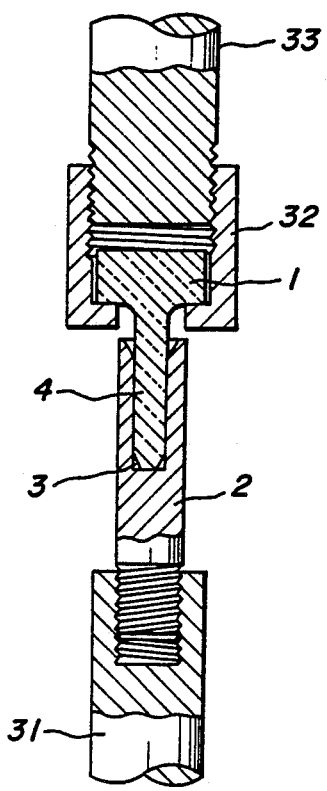

METAL-CERAMIC COMPOSITE BODIES

This is a continuation of application Ser. No. 867,441 filed May 28, 1986, now abandoned.

BACKGROUND OF THE INVENTION

1. Field of the Invention

This invention relates to metal-ceramic composite bodies and a method of producing the same, and more particularly to a metal-ceramic composite body obtained by joining a metallic member to a ceramic member through interference fitting and a method of producing the same.

2. Related Art Statement

Ceramics such as zirconia, silicon nitride, silicon carbide and so on are excellent in the mechanical strength, thermal resistance and abrasion resistance, so that they are noticed to be used as high-temperature structural materials or abrasion-resistant materials for engine parts, gas turbine engine parts and the like. However, the ceramics are generally hard and brittle, so that they are poor in the formability as compared with metallic materials. Furthermore, they are poor in the toughness and weak in the resistance to impact force. Therefore, it is difficult to make machinery components such as engine parts and the like from only the ceramic materials, so that it is usually used as a composite body of metallic member and ceramic member.

Heretofore, in the manufacture of products such as turbocharger rotor and the like by joining metal and ceramic to each other, when the ceramic member is integrally united with the metallic member by inserting the protrusion formed in the ceramic member into the depression or through-hole formed in the metallic member. For example, both the members are heated at a certain temperature and joined to each other and then cooled, whereby they are joined to each other based on the fastening force between the metallic member and the ceramic member produced by the difference in thermal expansion therebetween.

The metallic member and the ceramic member have hitherto experimentally been joined to each other by heating at an approximately service temperature or at a temperature equal to or somewhat higher than the service temperature. That is, the heating temperature has hitherto been set only by considering the interference in the cooling, and the restriction of the heating temperature has not been made at all.

Lately, it is highly demanded to use the metal-ceramic composite body at higher temperature, while it is strongly required to make the interference large so as to provide a strong fastening force. Therefore, if it is intended to join the metallic member to the ceramic member through interference fitting by heating to higher temperature, there may be caused a case that the joining strength is not obtained in accordance with the material used, i.e. a composite body having no joining force between metal and ceramic may be produced.

SUMMARY OF THE INVENTION

It is, therefore, an object of the invention to solve the aforementioned problems and to provide metal-ceramic composite bodies, which can always hold a joining force through a constant interference fitting even under any service conditions, and a method of producing the same.

According to a first aspect of the invention, there is the provision of a metal-ceramic composite body formed by interference fitting a protrusion formed in a ceramic member with a depression or through-hole formed in a metallic member, characterized in that said metallic member is made of a metal producing a martensitic transformation and has a structure selected from a tempered structure, a normalized structure and an age hardened structure.

According to a second aspect of the invention, there is provided a method of producing a metal-ceramic composite body by joining a protrusion formed in a ceramic member to a depression or through-hole formed in a metallic member through interference fitting, which comprises inserting said protrusion of the ceramic member into said depression or through-hole of the metallic member made of a metal having a martensitic transformation, and joining them to each other through interference fitting at a temperature lower than that temperature which begins to change a structure of said metal into an austenite phase or a temperature between the above defined temperature and a service temperature of the resulting joint portion.

BRIEF DESCRIPTION OF THE DRAWINGS

The invention will be described with reference to the accompanying drawings, wherein:

FIG. 1 is a graph illustrating an interference fitting mechanism produced when the ceramic member is inserted into the metallic member at high temperature;

FIG. 2a is a schematic view showing a fitted state between the ceramic member and the metallic member;

FIG. 2b is a schematic view showing a detached state between the ceramic member and the metallic member;

FIG. 3 is a graph showing a thermal expansion curve of a maraging steel;

FIG. 4 is a schematic view of an embodiment of the metal-ceramic composite body according to the invention; and FIG. 5 is a sectional view of a main part of a drawing test.

DESCRIPTION OF THE PREFERRED EMBODIMENTS

The invention is based on the discovery that the temperature in the interference fitting between the metallic member and the ceramic member is restricted to a temperature lower than the transformation temperature of the metallic member, whereby the joining force through a constant interference fitting can always be obtained even under any service conditions. The invention will be described with respect to the generation mechanism of interference producing the joining force between the metallic member and the ceramic member with reference to the drawings below.

FIG. 1 illustrates the generation mechanism of interference when the ceramic member is inserted into the metallic member at high temperature. In FIG. 1, Ms is a beginning temperature of martensitic transformation, $T_L$ a fitting temperature (Invention), $T_H$ a fitting temperature (Comparative example), To a temperature of transforming low temperature stable phase into high temperature stable phase for example, (for example, $Ac_1$, $Ac_3$), $d_H$ a diameter of the protrusion of the ceramic member at $T_H$, $d_L$ a diameter of the protrusion at $T_L$, do a diameter of the protrusion at room temperature, $D_H$ an inner diameter (room temperature) of the depression of the metallic member after the drawing from the composite body fitted at $T_H$, and $D_L$ an inner diameter (room temperature) of the depression after the drawing from the composite body fitted at $T_L$. For more understanding the above relationships, FIG. 2a shows an embodiment of the fitted state between the metallic member and the ceramic member, and FIG. 2b shows an embodiment of the detached state therebetween. In FIG. 2b, $\Delta D$ is an amount of size change due to elastic deformation or an interference. As an example of the metallic material exhibiting such a transformation, a thermal expansion curve of a maraging steel is shown in FIG. 3.

At first, the invention will be described with reference to a case that the ceramic member and the metallic member are press fitted to each other at a temperature below the transformation temperature or $T_L < T_O$ being the range defined in the invention. As shown in FIG. 2a, the diameter (d) of the ceramic protrusion is coincident with the inner diameter (D) of the metallic depression at a temperature $T_L$. However, the ceramic and metal are different in the thermal expansion coefficient, and the thermal expansion coefficient of the metal is generally larger than that of the ceramic, so that when both the members are cooled at such a fitted state, the diameter of the ceramic protrusion shrinks along an L-do line shown in FIG. 1. On the other hand, the inner diameter of the metallic depression tends to shrink along an L-C line, but the shrinking thereof is obstructed by the ceramic, so that the inner diameter shrinks along the L-do line. Therefore, the difference between the shrinking amount along the L-C line and the shrinking amount along the L-do line remains in the metal as elastic strain. However, if the difference of the shrinking amount exceeds elastic limit (B), the metallic depression produces plastic deformation to absorb the shrinking amount difference exceeding the elastic limit. As a result, the difference between the shrinking amount along the L-do line and the shrinking amount along L-B-$D_L$ line finally remains in the metal as an elastic strain. At this time, when the ceramic member is drawn out from the metal-ceramic composite body press fitted at $T_L$, the elastic strain is released to shrink the inner diameter of the metallic depression up to $D_L$. This shrinking amount of $\Delta D_L = d_o - D_L$ is an interference in case of the fitting at $T_L < T_O$.

On the contrary, when the press fitting is performed at a temperature higher than the transformation temperature being outside the range of the invention or $T_H > T_O$, the following is caused. That is, the diameter of the ceramic protrusion is coincident with the inner diameter of the metallic depression at the temperature $T_H$. When the cooling is started from the above state, the diameter of the ceramic protrusion shrinks along an H-do line shown in FIG. 1. While, the inner diameter of the metallic depression tends to shrink along an H-A line, but the shrinking thereof is obstructed by the ceramic, so that the inner diameter shrinks along the H-do line. Therefore, at a stage that the temperature falls down to Ms point, the difference between the shrinking amount along H-A-M line and the shrinking amount along H-do line remains in the metal as an elastic strain. However, martensitic transformation is occurred at the Ms point to expand the metal along an M-$D_H$ line, so that a greater part of the elastic strain is released. As a result, even if the ceramic member is drawn from the composite body fitted at the temperature $T_H$, the inner diameter of the metallic depression only shrinks to $D_H$. This shrinking amount of $\Delta D_H = d_o - D_H$ is an interference of the composite body press fitted at the temperature $T_H$.

As apparent from the above, the shrinking amount is $\Delta D_L > \Delta D_H$, so that when the fitting is performed at the temperature below the transformation temperature To being the range of the invention, the good fastening force or the grasping force between the metal and ceramic can be obtained.

Therefore, the invention is effective as a method of fitting ceramic into metal producing martensitic transformation in the cooling to expand its volume, preferably a method of fitting ceramic into metal producing martensitic transformation even under the condition of slow cooling rate as in air cooling.

In case of a metal producing martensitic transformation only at a fast cooling rate as in water cooling, after this metal is fitted with ceramic at a temperature above transformation temperature To, the quenching such as water cooling or the like is performed to expand the volume of the metal through martensitic transformation, whereby the interference is lowered.

Moreover, when the above metal is cooled from the temperature above transformation point To by furnace cooling or air cooling, the volume expands at $Ar_1$ transformation point or $Ar_3$ transformation point to lower the interference. Therefore, it is unfavorable to fit the ceramic into the metal at the temperature above transformation point To.

The reason for the limitations of the invention will be described below.

At first, the reason on the limitation of the interference is as follows.

As previously mentioned, the interference exceeding the limit of elastic strain of metal can not be given in the invention, so that the upper limit of the interference is the limit of elastic strain of metal.

The term "limit of elastic strain ($\epsilon y$)" used herein is a value obtained by a ratio of yield stress ($\sigma y$) to longitudinal elastic coefficient (E) in the metal or $\epsilon y = \sigma y / E$.

On the other hand, the lower limit of the interference is 0.2%. When the interference is less than 0.2%, the sufficient fastening force can not be obtained.

The reason on the limitation of the metallic structure is as follows.

According to the invention, the metal to be used is subjected to a heat treatment such as quench hardening and tempering, normalizing or the like before the fitting, or to an age hardening treatment after the fitting, whereby the metallic structure having desirable mechanical properties is obtained.

However, when the fitting is carried out at a temperature above the transformation point To, the metallic structure changes from the tempered or normalized structure before the fitting to high temperature stable structure, which never return to the original metallic structure even in the cooling.

As the metallic structure changes, the mechanical properties of the metal also change, so that according to the invention, the metallic structure after the fitting is limited to be made the same as the metallic structure before the fitting.

Furthermore, in case of a metal having desirable mechanical properties by the age hardening treatment after the martensitic transformation, it may be subjected to the age hardening treatment after the fitting. In this case, however, it is necessary to perform the fitting at the temperature below the transformation point To as mentioned above. If the fitting is performed at the temperature above transformation point To, the ceramic member loosens from the joint portion due to martensitic transformation in the course of the cooling, or the interference lowers. If the interference lowers, the ceramic member unfavorably loosens from the joint portion due to the reheating for the age hardening treatment.

The reason on the limitation of transformation beginning time in isothermal transformation diagram is based on the fact that steels requiring not less than 10 seconds for the fastest transformation beginning in the isothermal transformation diagram may largely produce martensite through air cooling.

The following example is given in illustration of the invention and is not intended as limitation thereof.

EXAMPLE hours and then its outer shape was worked. On the other hand, when using the Ni-Cr-Mo steel (SNCM5) or alloy tool steel (SKD6), each material was subjected to a heat treatment such as quench hardening or tempering and then the ceramic member 1 was fitted to the metallic member 2 at a given fitting temperature, whose outer diameter was worked into a desired form.

The drawing test was conducted with respect to the product Nos. 1–7 according to the invention and No. 12 of comparative example. FIG. 5 shows a sectional view of a main part of the drawing test. A pull rod 31 was threaded with the metallic member 2, while the other pull rod 33 fixed to the ceramic member 1 together with a jig 32 threaded therewith as shown in FIG. 5. Thereafter, the pull rods 31 and 33 were set to the tensile testing machine. The thus measured results are shown in Table 1.

TABLE 1

| | Material | | Transformation beginning temperature (heating) °C. | Fitting temperature °C. | Size before fitting | | Size after drawing test Inner diameter of depression (D) mm | Interference % | Drawing test | | Remarks |
|---|---|---|---|---|---|---|---|---|---|---|---|
| | Ceramic | Metal | | | Diameter of protrusion (do) mm | Inner diameter of depression (Do) mm | | | Test temperature °C. | Drawing load kg | |
| Run No. | | | | | | | | | | | |
| 1 | silicon nitride | maraging steel | 600 | 350 | 8.00 | 7.97 | 7.98 | 0.25 | 350 | 600 | YAG300 |
| 2 | silicon nitride | maraging steel | 600 | 350 | 8.00 | 7.90 | 7.96 | 0.50 | 350 | 1,300 | YAG300 |
| 3 | silicon nitride | maraging steel | 600 | 350 | 8.00 | 7.80 | — | — | 350 | >1,500 | breakage of ceramic |
| 4 | silicon carbide | nickel.chromium.molybdenum steel | 760 | 450 | 8.00 | 7.60 | 7.96 | 0.50 | 350 | 1,050 | SNCM5 |
| 5 | silicon carbide | nickel.chromium.molybdenum steel | 760 | 450 | 8.00 | 7.40 | 7.96 | 0.50 | 350 | 1,100 | SNCM5 |
| 6 | zirconia | alloy tool steel | 820 | 600 | 8.00 | 7.95 | 7.97 | 0.37 | 350 | 750 | SKD6 |
| 7 | zirconia | alloy tool steel | 820 | 600 | 8.00 | 7.90 | 7.95 | 0.62 | 350 | 1,400 | SKD6 |
| (Comparative Example | | | | | | | | | | | |
| 11 | silicon nitride | maraging steel | 600 | 850 | 8.00 | 7.80 | 8.01 | | | 0 | loosen during cooling |
| 12 | silicon nitride | nickel.chromium.molybdenum steel | 760 | 850 | 8.00 | 7.40 | 7.99 | 0.12 | 350 | 50 | SNCM5 |

FIG. 4 shows an embodiment of the metal-ceramic composite body according to the invention. As the ceramic member 1, there was used silicon nitride, silicon carbide or zirconia, which was prepared by pressureless sintering process and had a protrusion 4 of 8 mm in diameter and 25 mm in length. As the metallic member 2, there was used maraging steel (YAG300), nickel-chromium-molybdenum steel (SNCM5) or alloy tool steel (SKD6), whose depression 3 had various inner diameters slightly smaller than 8 mm and an outer diameter of 10 mm. The ceramic member 1 was press fitted into the metallic member 2 at a fitting temperature as shown in the following Table 1 so as to provide a fitting distance of 12 mm, whereby composite body Nos. 1–7 according to the invention and Nos. 11 and 12 as comparative examples.

As a method of producing the ceramic-metal composite body, when using the maraging steel (YAG300) as the metal member, the metallic material after the solution treatment was shaped into the desired form for the joint portion, and thereafter the ceramic member 1 was fitted to the metallic member 2 at a given fitting temperature. The resulting composite body was subjected, for example, to an age hardening treatment at 500° C. for 3

In Table 1, the interference (%) was determined by the calculation of $\{(do-D)/do\} \times 100$. As seen from Table 1, the composite body Nos. 1–7 according to the invention had a sufficient drawing load, while in the body No. 12 of comparative example, the sufficient interference was not obtained and consequently the satisfactory drawing load cannot be obtained.

The invention is not limited to the above example, but is possible to perform various changes or modifications. For instance, the invention can be sufficiently attained by using nickel steel, chromium steel, nickel-chromium steel, nickel-molybdenum steel or the like as the metallic material and sialon, alumina or the like as the ceramic material.

As apparent from the above detailed explanations, according to the metal-ceramic composite body of the invention, the temperature in the fitting between the metallic member and the ceramic member is limited to not more than the temperature of transforming the structure of the metallic member from low temperature stable phase to high temperature stable phase, whereby there can be obtained a metal-ceramic composite body having a joining force based on an always constant interference fitting even under any service conditions.

Therefore, when the invention is applied to the joining between a turbocharger rotor and its rotary shaft required in use at higher temperature, the better result can be attained.

What is claimed is:

1. A metal-ceramic composite body comprising a metallic member having a depression or through-hole therein, and a ceramic member having a protrusion inserted into said depression or through-hole by interference fitting above room temperature, said metallic member comprising at least one metallic material selected from the group consisting of maraging steel, nickel-chromium-molybdenum steel, nickel steel, chromium steel, nickel-chromium steel and nickel-molybdenum steel, said metallic material inherently producing martensitic transformation upon cooling in ambient air from a high temperature to expand its volume, and having at least one non-martensitic structure selected from the group consisting of a tempered structure, a normalized structure and an age hardened structure.

2. The metal-ceramic composite body according to claim 1, wherein said metallic material is a metal requiring not less than 10 seconds after the commencement of said cooling for beginning martensitic transformation.

3. The metal-ceramic composite body according to claim 1, wherein an interference of said interference fitting is not less than 0.2% of a diameter of said protrusion.

4. The metal-ceramic composite body according to claim 1, wherein said ceramic member is composed of at least one ceramic material selected from the group consisting of silicon nitride, silicon carbide, sialon, alumina and partially stabilized zirconia.

5. The metal-ceramic composite body according to claim 1, wherein said ceramic member is a rotary shaft at a side of turbine rotor in a turbocharger rotor, and said metallic member is a rotary shaft at a side of a compressor wheel in a turbocharger rotor.

* * * * *

UNITED STATES PATENT AND TRADEMARK OFFICE
CERTIFICATE OF CORRECTION

PATENT NO. : 4,897,311

DATED : January 30, 1990

INVENTOR(S) : Isao ODA et al.

It is certified that error appears in the above-identified patent and that said Letters Patent is hereby corrected as shown below:

On the title page, under item [30] Foreign Application Data, "June 28, 1985" should read --June 12, 1985--.

Signed and Sealed this

Fifteenth Day of October, 1991

Attest:

HARRY F. MANBECK, JR.

*Attesting Officer*  *Commissioner of Patents and Trademarks*